US007519270B2

United States Patent
Kim (10) Patent No.: US 7,519,270 B2
(45) Date of Patent: Apr. 14, 2009

(54) RECORDING MEDIUM PLAYER CAPABLE OF AUTOMATICALLY SETTING PLAYBACK MODE AND METHOD FOR CONTROLLING THE SAME

(75) Inventor: Yong-Ho Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1077 days.

(21) Appl. No.: 10/352,077

(22) Filed: Jan. 28, 2003

(65) Prior Publication Data
US 2003/0147627 A1 Aug. 7, 2003

(30) Foreign Application Priority Data
Feb. 5, 2002 (KR) ................................. 2002-6574

(51) Int. Cl.
H04N 5/93 (2006.01)
H04N 5/00 (2006.01)
(52) U.S. Cl. ........................... 386/83; 386/125; 386/126
(58) Field of Classification Search ..................... 369/2; 705/1; 386/45, 125, 126, 95, 83
See application file for complete search history.

(56) References Cited

U.S. PATENT DOCUMENTS

| 5,652,824 | A | * | 7/1997 | Hirayama et al. ............. 386/95 |
| 5,835,670 | A | | 11/1998 | Hirayama et al. |
| 6,091,884 | A | | 7/2000 | Yuen et al. |
| 6,442,333 | B1 | * | 8/2002 | Izawa ........................... 386/95 |
| 2002/0034127 | A1 | * | 3/2002 | Numano et al. ................ 369/2 |
| 2002/0072926 | A1 | * | 6/2002 | Morita et al. .................. 705/1 |
| 2004/0120228 | A1 | * | 6/2004 | Han ........................ 369/30.25 |

FOREIGN PATENT DOCUMENTS

| EP | 0890951 | 1/1999 |
| JP | 2001-359042 | 12/2001 |
| WO | WO 92/04801 | 3/1992 |

* cited by examiner

Primary Examiner—Thai Tran
Assistant Examiner—Hung Q Dang
(74) Attorney, Agent, or Firm—Roylance, Abrams, Berdo & Goodman, L.L.P.

(57) ABSTRACT

A recording medium player capable of automatically setting a previously set playback mode with respect to a recording medium loaded in the recording medium player. When a recording medium is loaded in the recording medium player, a control unit of the recording medium player reads basic information from the recording medium. Based on the basic information, a content name representing the basic contents of the information stored on the recording medium, such as the title of a program or movie stored on the recording medium, is determined. Thereafter, the controller searches a storage unit, such as a hard disk, for a file name having the same content name as that of the loaded recording medium. If such a file name exists in the hard disk, the playback mode selection value matched to that file is read from the hard disk and is set as the playback mode for the recording medium. If such a file does not exist in the hard disk, a new file corresponding to the content name of the loaded recording medium is created in the hard disk. Then, the playback mode selection value selected by a user is stored in the hard disk and matched with the newly created file. Accordingly, when a certain recording medium is loaded into the player, if the recording medium is a recording medium that was once previously reproduced, the previous playback mode selection value is automatically set for that recording medium, thereby eliminating the inconvenience and time consumption needed to set the playback mode again for that recording medium.

18 Claims, 5 Drawing Sheets

FILE NAME: YOU'VE_GOT_MAIL_16X9_FF_NA

CONTENTS RECORDED IN FILE

- DISK VOLUME NAME: YOU'VE_GOT_MAIL_16X9_FF_NA
- TIMES OF REPRODUCTION: 2
- LAST REPRODUCTION DATE: 2001. 10. 19
- STOP LOCATION: CHAPTER 5, FRAME 17159
- SELECTED CAPTION: KOREAN
- SELECTED VOICE: ENGLISH

FIG.5

MAIN INFORMATION

Name: YOU'VE_GOT_MAIL_16X9_FF_NA
Size(B):4509386752
Frames: 171939
Title: 1
Angle: 1
MinDataRate(B/s):1170
AvgDataRate(B/s):638576
MaxDataRate(B/s):63488000

VIDEO INFORMATION

Compression: MPEG-2
TV system: NTSC
Aspect ratio: 16:9
TV system: pan-scan
Display mode: 720x480
Resolution: no
Letterboxed: camera
Mode:

RECORDING MEDIUM PLAYER CAPABLE OF AUTOMATICALLY SETTING PLAYBACK
MODE AND METHOD FOR CONTROLLING
THE SAME

This application claims benefit under 35 U.S.C. § 119 from Korean Patent Application No. 2002-6574, filed on Feb. 5, 2002, the entire content of which is incorporated herein by reference.

BACKGROUND OF THE INVENTION

1. Field of the Invention

The present invention relates to a recording medium player and a method for controlling the same. More particularly, the present invention relates to a recording medium player capable of automatically setting a previously set playback mode with respect to a loaded recording medium, and a method for controlling the same.

2. Description of the Related Art

With the development of data recording methods, a wide variety of recording media capable of storing a substantial amount of data, as well as players for the recording media, are being launched. For example, in the case of section recording, a recording medium such as a DVD (Digital Versatile Disk) has a storage capacity of about 4.7 GB. Unlike a general VCR (Video Cassette Recorder) tape, if a movie is to be stored on the DVD, the DVD can contain multilingual voice information and multilingual caption information along with high definition video data. A DVD player provides a user with a playback mode set menu that enables the user to set voice and caption in a desired language, and the recording medium can be played with the voice and caption in the language selected by the user.

However, in the DVD player, because a DVD title contains various reproduction information such as multilingual caption information and multilingual voice information, the user has to set a playback mode to a desired language, which is inconvenient. The user may set a default value for voice and caption modes, and have the reproduction performed according to the default value with respect to the loaded DVD title. However, considering the fact that users usually want different playback modes, and because different DVD titles contain different information, it is almost essential for the user to set the playback mode for each different DVD. For instance, in a case where a DVD title for children, such as "Mermaids", contains voice and caption information in both Korean and English, selecting a Korean voice mode while turning off the caption information can be made as a default playback mode. Thereafter, for reproducing a new DVD title called "You've got mail" containing English voice information and Korean, English and Chinese caption information, the playback mode set for reproducing the "Mermaids" title which was previously played is not appropriate for the current DVD title. Hence, the user must select desired voice and caption modes again. Also, in order to reproduce the "Mermaids" DVD title again, setting of the playback mode must be made all over again.

As described above, in the conventional DVD player, even if the user wants to watch the same DVD title in the previous playback mode, he or she must set a desired playback mode by the individual categories every time he or she watches the DVD. This makes the reproduction process inconvenient for the user, and causes unnecessary time consumption for selecting the desired features from the reproduction menu.

SUMMARY OF THE INVENTION

An object of the invention is to solve at least the above problems and disadvantages, and to provide at least the advantages described below.

Accordingly, an object of the present invention is to solve the foregoing problems by providing a recording medium player capable of automatically setting a previously set playback mode from among various reproduction information with respect to a recording medium if the same recording medium is being played by the system, and a method for controlling the same.

To substantially achieve the above objects, an embodiment of the present invention provides a recording medium player comprising a recording medium reader for reading data recorded on a recording medium, and a storage device for storing a respective playback mode selection value selected by a user for each of a plurality of recording media previously reproduced by the recording medium player, with the respective playback mode selection values being matched with the respective identifier corresponding to each respective recording medium. The recording medium player further comprises a control unit for reading out identification information from the recording medium upon loading of the recording medium in the player, and for setting the playback mode of the player as that which corresponds to the playback mode selection value matching with the identifier when the identifier corresponding to the loaded recording medium exists in the storage unit.

The data recorded on the recording medium can contain video contents that was stored in a remote server.

The storage unit can include a hard disk configured to store a large amount of data, or can be configured as a portion of a memory installed in the player, or as a separate memory.

The identifier can include information representing the general contents of the data stored on the recording medium, such as the title of the program or movie stored on the recording medium. Each recording medium can contain a plurality of different groups of data, such as a plurality of different shows or programs, and the identifier can represent each respective group of data stored on the recording medium. In addition, the identifier can be detected based on a single identification information or a plurality of identification information. For example, if a program name and data storage capacity of a recording medium previously reproduced by the player are the same as a recording medium currently loaded in the player, a matched playback mode selection value is set as the playback mode by which the player will play the recording medium currently loaded in the player.

In addition, the recording medium player further comprises an input unit for receiving a setting command provided by the user, and an output unit for outputting the playback mode set menu to enable the user to set the playback mode. If the identifier corresponding to the recording medium currently loaded in the player does not exist in the storage unit, the control unit controls the output unit to output the playback mode selection menu, and stores in the storage unit the playback mode selection value selected by the user via the input unit, with the playback mode selection value being matched to the identifier corresponding to the recording medium loaded in the player.

In addition, if the identifier corresponding to the recording medium currently loaded in the player exists in the storage unit, the output unit outputs a menu for enabling a user to select whether to maintain the previously selected playback mode matched to the identifier.

Another embodiment of the present invention provides a method for setting a playback mode of a recording medium player. The method comprises the steps of reading identification information from the recording medium loaded in the player, and searching whether there exists an identifier corresponding to the recording medium in a storage unit where the playback selection value selected by the user for each of the previously reproduced recording media is stored as matching with the identifier corresponding to each recording medium. The method further comprises setting the playback mode selection value matched with the identifier to the playback mode of the recording medium presently loaded in the player if the identifier corresponding to that recording medium exists in the storage unit.

The method for setting a playback mode of a recording medium player further comprises the steps of outputting a playback mode selection menu to enable the playback mode to be set by the user if there exists no identifier corresponding to the loaded recording medium in the storage unit, and storing the selected playback mode after being matched with the identifier corresponding to the loaded recording medium if the playback mode for the loaded recording medium is selected by the user via the playback mode set menu.

In addition, if the identifier corresponding to the previously reproduced recording medium exists in the storage unit, the menu for enabling a user to select whether or not to maintain the playback mode matched to the identifier is output. Specifically, the playback mode selection value matched with the identifier is output along with the menu for enabling the user to select whether or not to maintain the playback mode. The user can maintain the playback mode selection value for the loaded recording medium, or can set a new playback mode.

If the user wants to set a new playback mode for the loaded recording medium to change the previous playback mode selection value, the playback mode set menu for the loaded recording medium is output and the playback mode selection value matched to the identifier is updated with the playback mode selection value selected via the playback mode set menu. When an update command is given via the menu, the playback mode selection value can be included in the update.

As can be appreciated from the above, the recording medium player and method according to an embodiment of the present invention enables the recording medium player to automatically set the playback mode to the playback mode selection value for the recording medium that was selected when the recording medium was previously played, thus eliminating the inconvenience and time consumption necessary for setting the playback mode again.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

An embodiment of the present invention will now be described in detail with reference to the accompanying drawings.

Figure 1:
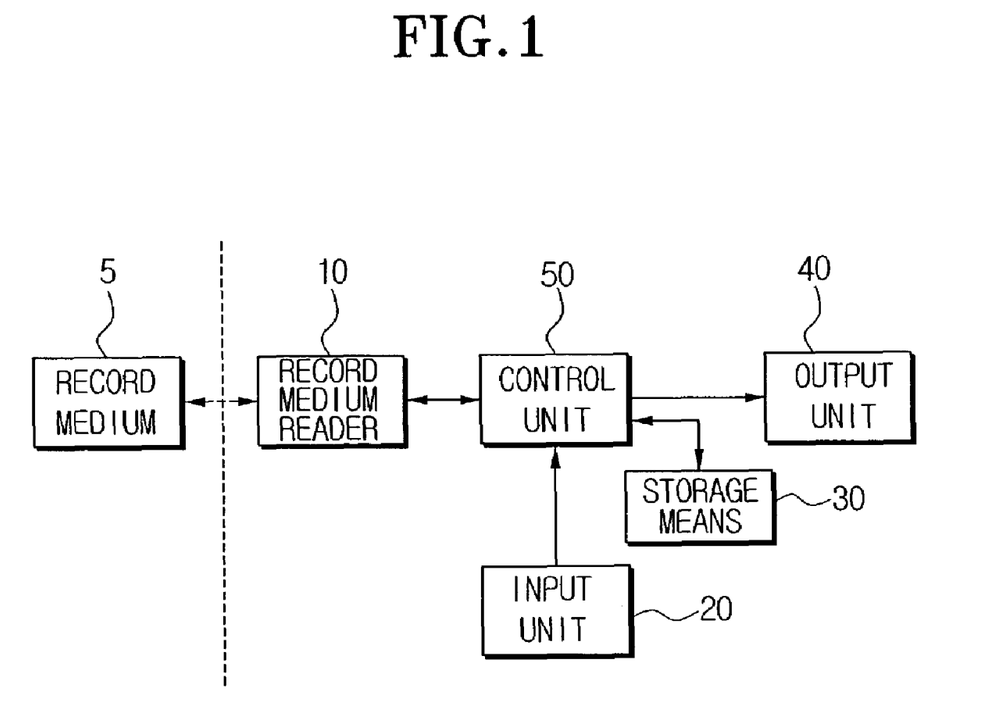
FIG. 1 is a block diagram of an example of a recording medium player in accordance with an embodiment of the present invention.

FIG. 1 is a block diagram of a recording medium player in accordance with an embodiment of the present invention. The recording medium player includes a recording medium reader 10, an input unit 20, a storage unit 30, an output unit 40, and a control unit 50.

The recording medium reader 10 senses the presence of a recording medium 5, notifies the control unit 50, and reads out data from the loaded recording medium 5 under the control of the control unit 50.

The input unit 20 receives from a user a command related to the reproduction of the recording medium 5 and the selection of a playback mode. The input unit 20 can be a remote controller or can be a key input unit for generating a command input signal in response to a direct key input of the user. Also, the input unit 20 can be a voice input unit for generating a command input signal according to a voice command.

The storage unit 30 stores a playback mode selection value of the user for each previously reproduced recording media, which is matched with an identifier corresponding to each recording medium. The storage unit 30 can be configured as a hard disk drive to store a large amount of data, or can be configured as a portion of a memory installed in the player. In addition, a separate memory can be provided for the exclusive purpose of recording a playback mode selection value of the recording medium.

The output unit 40 outputs a reproduction signal read from the recording medium 5, and a playback mode set menu for allowing a user to set a playback mode of the recording medium under the control of the control unit 50. Generally, the output unit 40 is connected to a display device (not shown).

When the recording medium 5 is loaded into the above-mentioned player, the recording medium reader 10 get basic information including the identifier of the recording medium 5 under the control of the control unit 50. Then, the control unit 50 searches whether the identifier corresponding to that recording medium 5 exists in the storage unit 30. If the corresponding identifier exists, the playback mode for the recording medium 5 is automatically set as a playback mode selection value matched with the identifier in the storage unit 30.

Figure 2:
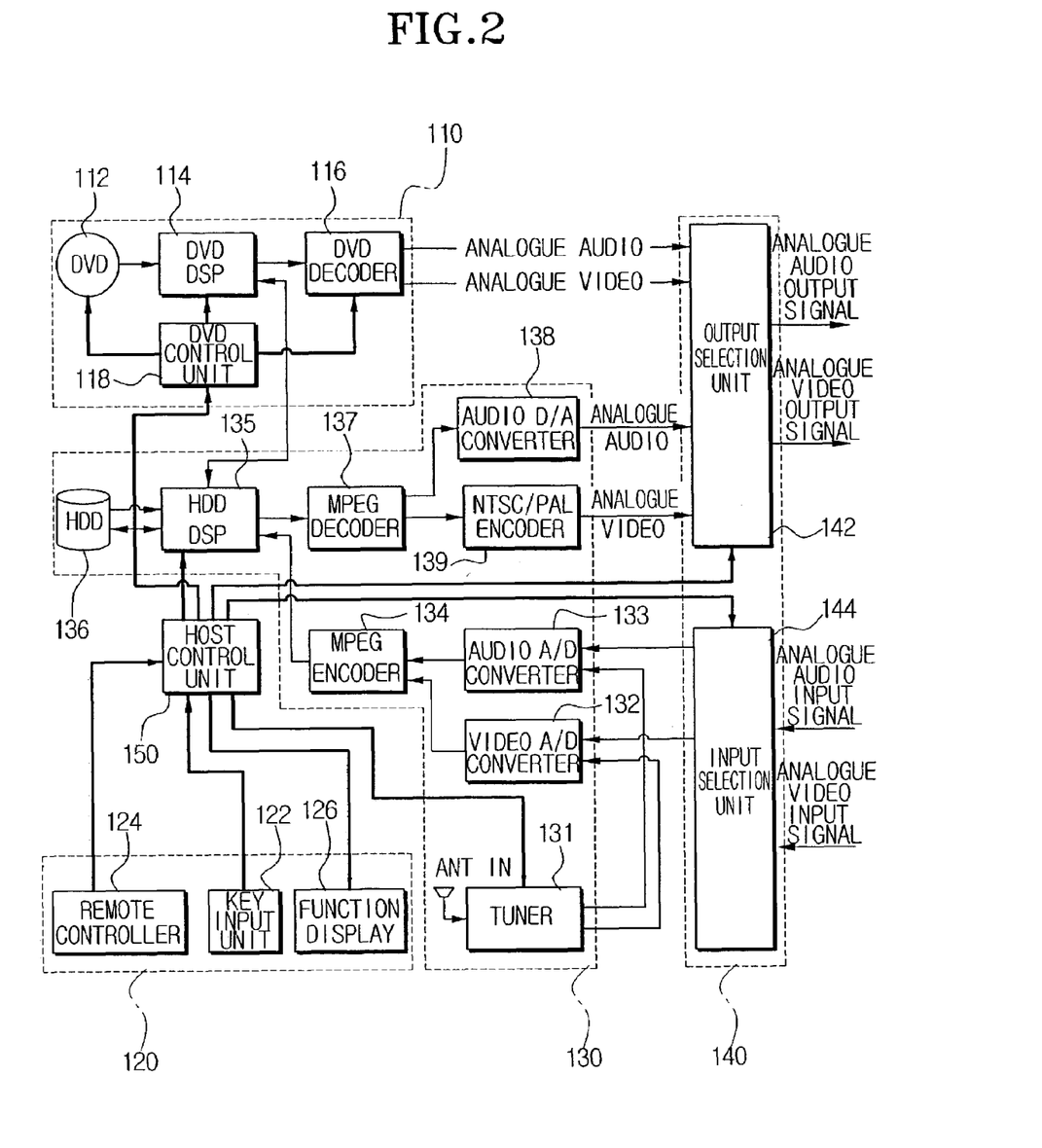
FIG. 2 is a block diagram of a composite apparatus of a DVD player and a television tuner in accordance with an embodiment of the present invention.

FIG. 2 is a block diagram of an example of a composite apparatus of a DVD player and a television tuner in accordance with an embodiment of the present invention. The composite apparatus includes a DVD player 110, an input panel 120, an HDD record player 130, an input/output selector 140, and a host controller 150.

The input panel 120 includes a remote controller 124, a key input unit 122 and a function display 126.

The DVD player 110 includes a DVD DSP 114 for outputting a pure DVD stream by removing digital data picked up from a DVD disk 112 except for additional data for error correction and pure digital signals, a DVD decoder 116 for decoding the DVD bit stream output from the DVD DSP 114 and outputting analog video and audio signals, and a DVD controller 118 for controlling the DVD player 110. In this example, the DVD player 110 is capable of reproducing a video CD and an audio CD as well as a DVD title. The DVD decoder 116 commonly includes a one-chip integrated circuit (IC). The IC includes a MPEG2 decoder (not shown), a NTSC/PAL encoder (not shown) for converting a digital video data into an analog video signal, and an A/D converter (not shown) for converting a digital audio data into an analog audio signal. The NTSC/PAL encoder and the A/D converter can be installed outside the IC according to the type of the IC used.

The HDD recording medium 130 converts input analog video and audio signals into digital data, compresses them in the MPEG format, and stores them in the HDD. Also, it reads digital video and audio data from the HDD and reproduces it. For this purpose, the HDD recording medium 130 is provided with a video A/D converter 132 and an audio A/D converter 133 for converting analog video and audio signals received through the television tuner 130 or an external input terminal 144 into digital video data and digital audio data, respectively. The HDD recording medium 130 further includes an MPEG encoder 134 for compressing the digital video data and the digital audio data converted by the video and audio A/D converters 132 and 133, and a HDD DSP 135 for storing the compressed data from the MPEG encoder 134 attached with an error correction code, reading the stored compressed data from the HDD 136, and outputting a pure compressed data through error correction. The HDD recording medium further includes an MPEG decoder 137 for restoring the digital compressed video and audio data read from the HDD DSP 135 and outputting a digital video and audio stream, an NTSC/PAL encoder 139 for converting the video stream output from the MPEG decoder 137 into an analog signal, and an audio D/A converter 138 for converting the audio stream outputted from the MPEG decoder 137 into an analog signal. The above-mentioned HDD recording medium 130 is configured to perform compression by the MPEG encoder 134, or another compression processor can be used for performing compression.

In the input/output selector 140, an input selection unit 144 selectively receives analog video and audio signals inputted from various external apparatuses (not shown). Additionally, the input selection unit 144 may have a digital interface (not shown) for interfacing digital data with the external apparatus (not shown) according to the type of system being used. An output selection unit 142 selectively outputs analog video and audio signals reproduced from the DVD disk 112, as well as analog video and audio signals reproduced from the HDD 136.

The host controller 150 controls the entire system. In particular, when the DVD disk 112 is loaded into the system, the host controller 150 determines whether the playback mode for the loaded DVD disk 112 is to be set as the previous set playback mode, or whether a new file name corresponding to the DVD title, or the title of a program or show stored on the DVD, is to be generated and stored in the HDD 136. The host controller 150 also determines whether the playback mode selection value selected by the user is to be matched with the generated file name for registration, according to whether or not the file name corresponding to the DVD title exists in the HDD 136.

Figure 3:
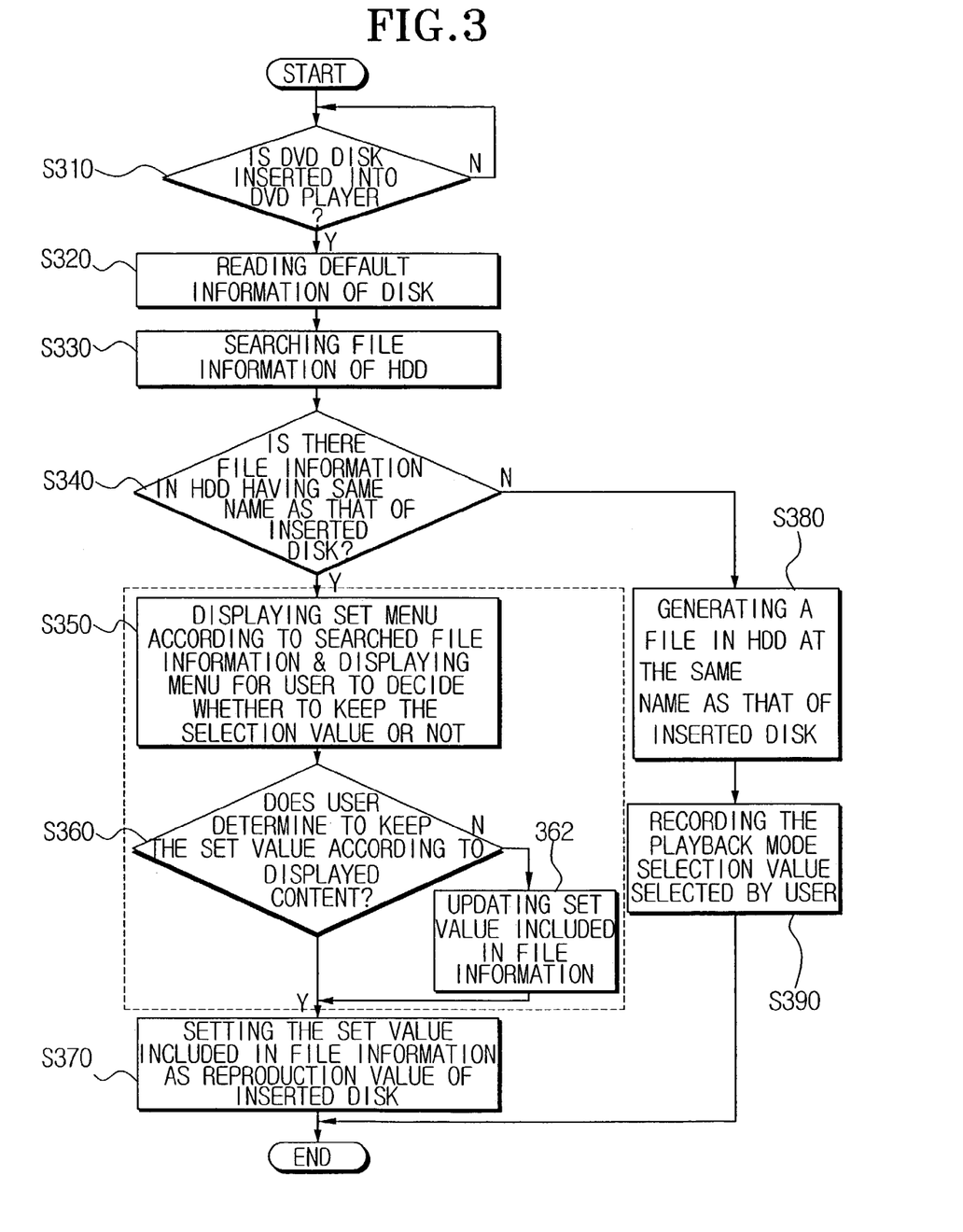
FIG. 3 is sequence view illustrating an example of the operation of a host control unit as shown in FIG. 2.

Referring to FIG. 3, an example of the operation of the host controller as shown in FIG. 2 will now be described in detail. When the DVD disk 112 is inserted into the DVD player 110 in step S310, the host controller 150 commands the DVD controller 118 to read out basic information of the DVD disk 112. Then, the DVD controller 118 drives a spindle motor (not shown), while positioning a pickup device (not shown) in the basic information containing region of the DVD disk 112 and reading out the basic information from the DVD DSP 114.

Figure 5:
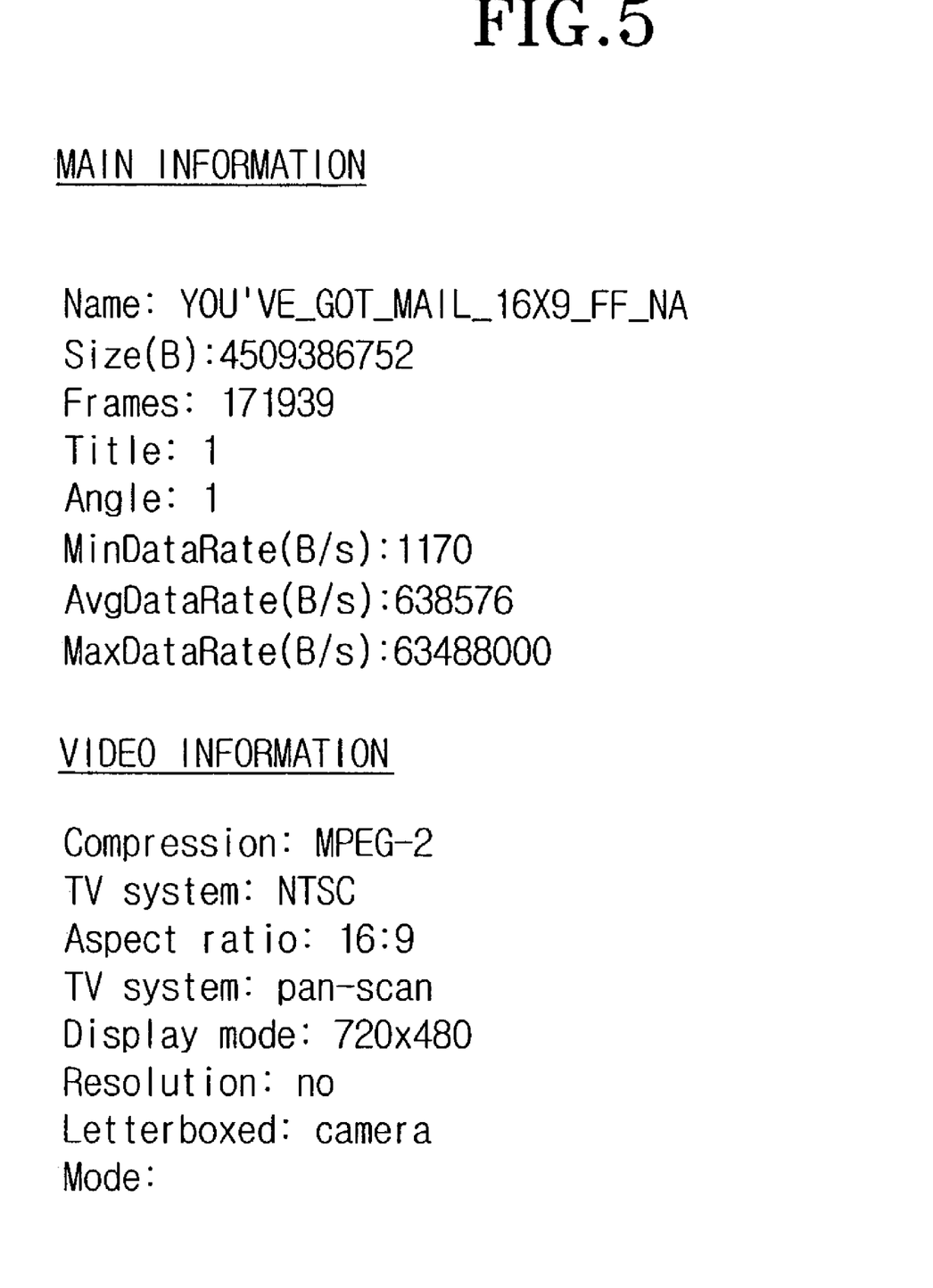
FIG. 5 is a view showing an example of basic information read out from the DVD disk a shown in FIG. 2.

FIG. 5 is a view showing basic information read out from the DVD disk as shown in FIG. 2. The basic information includes main information and video information, as well as stream information and chapter information which are not shown. The main information includes information on volume, size, frame number, data transfer rate and the like. The video information includes a compression method, an aspect ratio, a TV scan method, a display mode and the like.

Once the basic information is read out from the DVD disk 112, the host controller 150 determines the name (i.e., "YOU'VE GOT MAIL") of the DVD disk 112 read out from the DVD DSP 114 in step S320. Afterwards, the host controller 150 searches whether or not the file name having the same name as the loaded DVD disk exists in the HDD 136 in step S330. If it is determined in step S340 that the file name having the same name as the currently loaded DVD title exists in the HDD 136, the playback mode selection value (voice selection information, caption selection information, screen configuration ratio and the like) matched with the file are read to be played in the playback mode of the currently loaded DVD title. For example, in the previous reproduction for the currently loaded DVD title "YOU'VE GOT MAIL", if the set value is in "voice: English", "caption: Korean", the set value of the currently loaded DVD title is automatically set to "voice: English", "caption: Korean". When the file having the same name as the currently loaded DVD title exists in the HDD 136, a set menu is displayed such that a user can determine the playback mode selection value matched to the file, and whether or not to keep the selection value in step S350. If the user determines to keep the previous playback mode selection value in step S360, the playback mode of the currently loaded DVD disk 112 can be set. At this point, if the user determines to change the previous playback mode selection value, the playback mode set menu is displayed such that the user can set the playback mode, and the playback mode selection value of the HDD 136 can be updated according to the changed set value in step S362. At this point, the update set menu is displayed such that the user can determine whether to select the playback mode once or to use the set value continuously. The set value that has been either maintained in step S360 or updated in step S362 is then used as the reproduction value in step S370, in accordance with which the DVD player 110 will play the DVD disk 112.

On the contrary, if it is determined in step S340 that the name of the currently inserted DVD disk 112 does not exist in the HDD 136, the host controller 150 generates the file of the same volume name as the inserted disk in the HDD 136 in step S380). Then, the playback mode selection value selected by the user is recorded after being matched with the generated file in step S390. For example, if the user selects "voice: English" and "caption: Korean", the same information is recorded in the generated file of the HDD 136. At this time, the current data, current time and the like are detected through a timer and are further recorded on the generated file. Upon reproduction, the previous reproduction date and time information can be displayed to the user.

Figure 4:
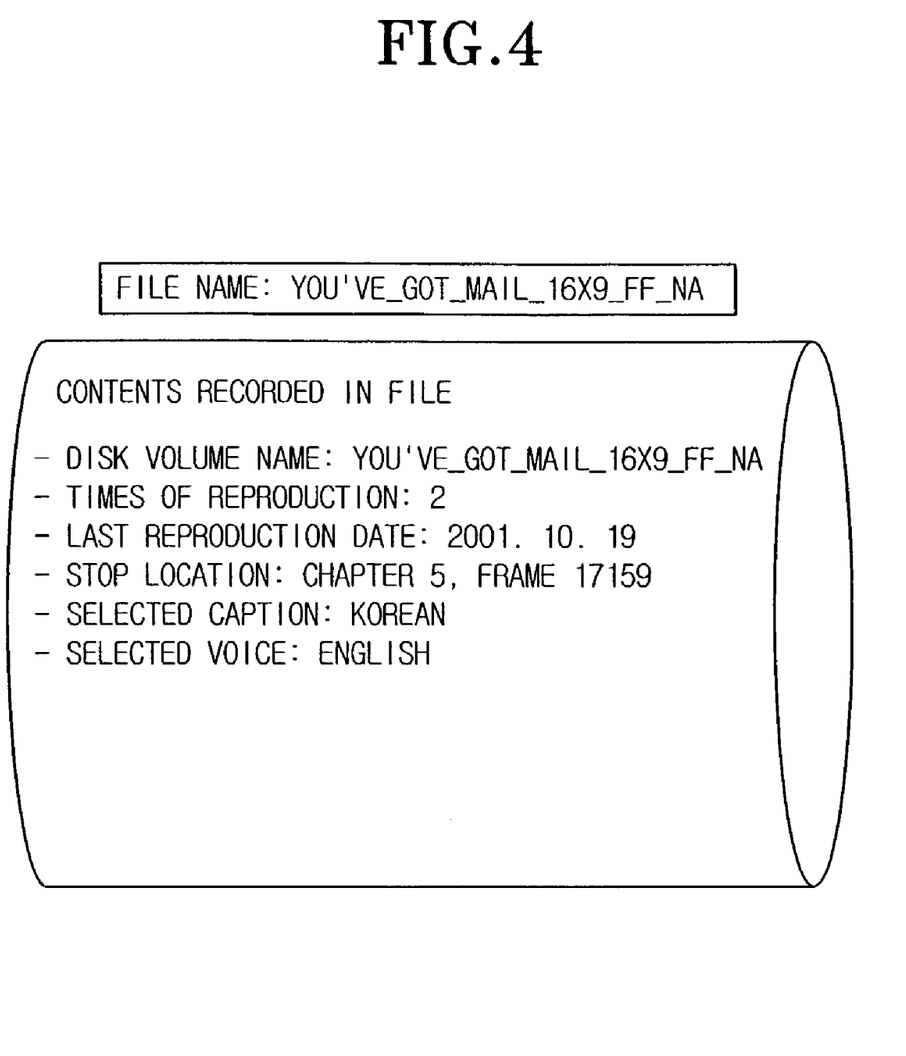
FIG. 4 is a view showing an example of the content of information on a DVD disk generated in a hard disk drive (HDD) of FIG. 2.

FIG. 4 shows an example of an information file recorded on the HDD with respect to a DVD disk loaded in the system. In the information file, a disk volume, a reproduction number of times, the last reproduction date, the stop position at the last reproduction, a selected caption and a selected voice are recorded. In addition, various information which the user can refer to upon reproduction can be recorded in the information file.

In this embodiment, although the composite apparatus includes a DVD player and a television tuner as an example, the present invention is applicable to a single player and various composite apparatuses, for example, various recording media as well as a DVD disk. Additionally, the invention is applicable to a video CD, audio CD, MP3 disk and the like, which are reproducible in the DVD player. Further, with respect to video contents recorded on a remote server, the playback mode can be automatically set according to whether or not the video contents have been reproduced previously.

As can be appreciated from the above, because the recording medium player automatically play a recording medium according to the previously set playback mode, the inconvenience of setting the playback mode of the recording medium in a specific set menu is eliminated. Furthermore, the recording medium can be reproduced without the time required to perform a setup task.

While the invention has been shown and described with reference to an embodiment thereof, it will be understood by those skilled in the art that various changes in form and details may be made therein without departing from the spirit and scope of the invention as defined by the appended claims.

What is claimed is:

1. A recording medium player, comprising:
    a recording medium reader, adapted to read out data recorded on a recording medium;
    a storage unit, adapted to store a respective playback mode selection value selected by a user for at least one respective recording medium that was previously reproduced by the recording medium reader, with each said respective playback mode selection value matching with a unique respective identifier corresponding to a said respective recording medium; and
    a control unit, adapted to read identification information of a said recording medium upon loading of a said recording medium into the recording medium reader, and being further adapted to set a playback mode of the loaded recording medium to the respective playback mode selection value that matches with the respective identifier corresponding to the loaded recording medium when that respective identifier exists in the storage unit;
    wherein the control unit sets the playback mode of the recording medium according to the identifier corresponding to the recording medium, and the identifier is a title of the recording medium.

2. The recording medium player according to claim 1, wherein the data includes video content.

3. The recording medium player according to claim 1, wherein the storage unit includes a hard disk drive.

4. The recording medium player according to claim 1, wherein the identifier represents a characteristic of the information stored on the recording medium.

5. The recording medium player according to claim 1, further comprising:
    an input unit, adapted to receive an input command provided by the user; and
    an output unit, adapted to output a playback mode set menu to enable the user to set the playback mode; and
    wherein when the identifier corresponding to the loaded recording medium does not exist in the storage unit, the control unit is adapted to control the output unit to output the playback mode set menu and to control the storage unit to store the playback mode selection value set by the user via the input unit, such that the stored playback mode selection value is matched to the respective identifier corresponding to the loaded recording medium.

6. The recording medium player according to claim 5, wherein if the identifier corresponding to the reproduced recording medium exists in the storage unit, the output unit is adapted to output a menu to enable the user to select whether to maintain the playback mode so that the user can determine whether to maintain the playback mode selection value that is matched to the identifier.

7. The recording medium player according to claim 6, wherein the control unit is adapted to control the output unit to output the playback mode selection value matched to the identifier along with the menu to enable the user to select whether to maintain the playback mode.

8. The recording medium player according to claim 7, wherein, if the previously set playback mode selection value is updated via the input unit, the control unit is adapted to update the playback mode selection value stored in the storage unit.

9. The recording medium player according to claim 8, wherein the control unit is further adapted to control the output unit to output the menu for enabling the user to select whether to update the playback mode, and if an update command is input via the input unit, the control unit is adapted to update the playback mode selection value.

10. A method for setting a playback mode of a recording medium player, comprising the operations:
    reading identification information from a recording medium loaded in the recording medium player;
    determining whether a unique identifier corresponding to the loaded recording medium exists in a storage unit where a respective playback selection value selected by the user for at least one respective recording medium previously reproduced by the recording medium player is stored, with each said respective playback mode selection value matching with a unique respective identifier corresponding to a said respective recording medium; and
    setting the playback mode of the loaded recording medium to the playback mode selection value that matches with the identifier if the identifier corresponding to the loaded recording medium exists in the storage unit;
    wherein the control unit sets the playback mode of the recording medium according to the identifier corresponding to the recording medium, and the identifier is a title of the recording medium.

11. The method according to claim 10, wherein if the identifier corresponding to the reproduced recording medium exists in the storage unit, performing the operation:
    outputting a menu for enabling a user to select whether to maintain the playback mode of the recording medium player designated by the playback mode selection value matching with the identifier.

12. The method according to claim 11, further comprising:
    outputting the playback mode selection value matching with the identifier along with the menu to enable the user to select whether to maintain the playback mode.

13. The method according to claim 12, further comprising the operations:
    outputting the playback mode set menu for the loaded recording medium if the playback mode is not maintained by the user via the menu; and
    updating the playback mode selection value stored in the storage unit if the playback mode selection value for the loaded recording medium is updated via the playback mode set menu.

14. The method according to claim 13, wherein the updating the playback mode selection value comprises the operations:

outputting the menu for enabling a user to select whether to update the playback mode; and updating the playback mode selection value if an update command is provided via the menu.

15. The method according to claim 10, further comprising the operations:

outputting the playback mode selection menu if there exists no identifier corresponding to the loaded recording medium in the storage unit; and storing in the storage unit the selected playback mode matched with the identifier corresponding to the loaded recording medium if the playback mode for the loaded recording medium is selected by the user via the playback mode selection menu.

16. The method according to claim 10, wherein the data includes video content.

17. The method according to claim 10, wherein the storage unit includes a hard disk drive.

18. The method according to claim 10, wherein the identifier represents a characteristic of the information stored on the recording medium.

* * * * *